July 3, 1951 J. DUNGLER Re. 23,384
TENTERING OR LIKE MACHINE FOR DRYING CLOTH OR OTHER MATERIAL
Original Filed July 22, 1947 3 Sheets-Sheet 1
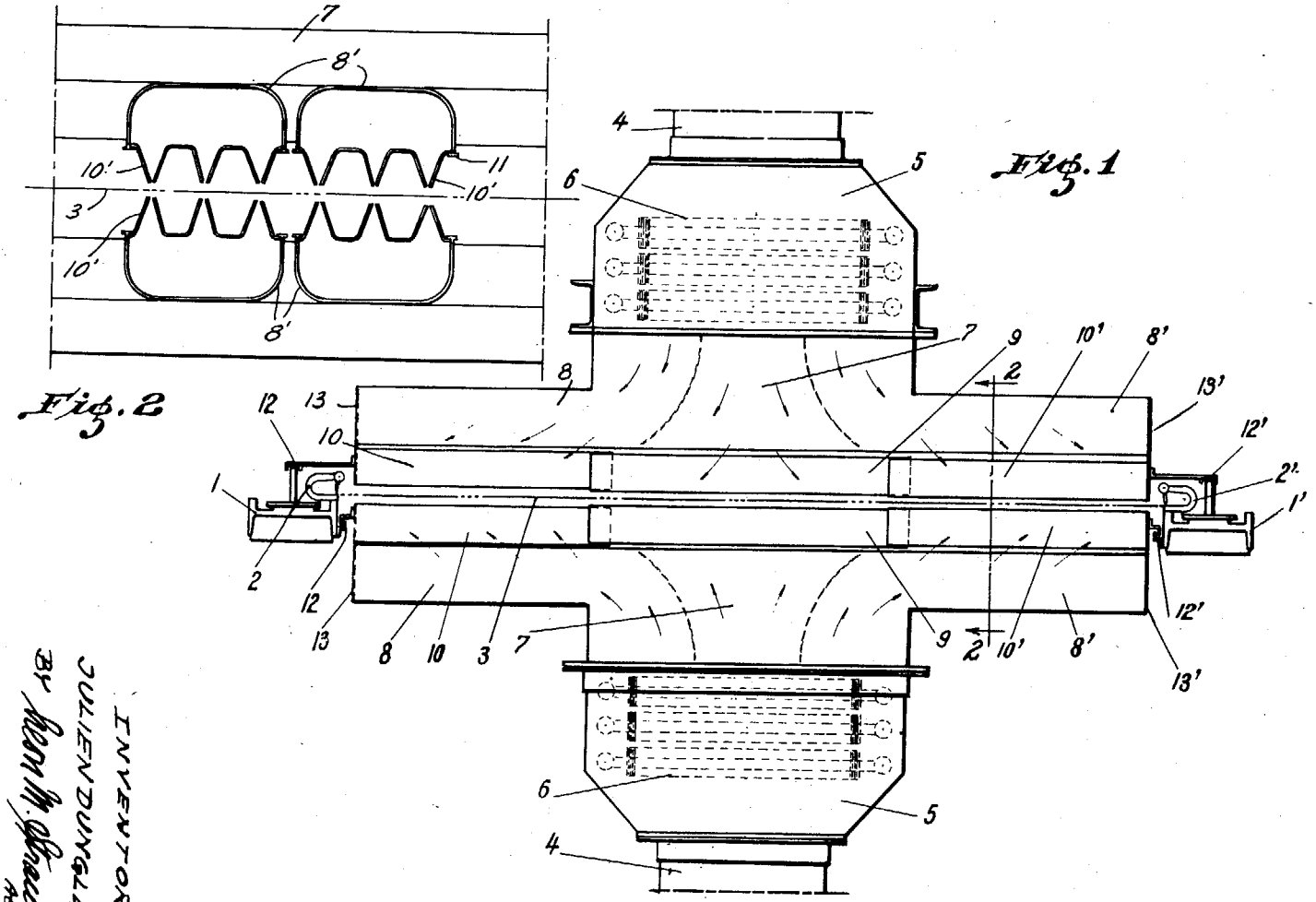
INVENTOR:
JULIEN DUNGLER
BY Leon M. Strauss
AGT.

July 3, 1951 J. DUNGLER Re. 23,384

TENTERING OR LIKE MACHINE FOR DRYING CLOTH OR OTHER MATERIAL

Original Filed July 22, 1947 3 Sheets-Sheet 2

INVENTOR.
JULIEN DUNGLER
BY Leon M. Strauss
ATT.

INVENTOR:
JULIEN DUNGLER
BY Leon M. Strauss
ATT.

Reissued July 3, 1951

Re. 23,384

UNITED STATES PATENT OFFICE 23,384

TENTERING OR LIKE MACHINE FOR DRYING CLOTH OR OTHER MATERIAL

Julien Dungler, Basel, Switzerland

Original No. 2,495,163, dated January 17, 1950, Serial No. 762,776, July 22, 1947. Application for reissue January 17, 1951, Serial No. 206,335. In France February 24, 1939

Section 1, Public Law 690, August 8, 1946
Patent expires February 24, 1959

11 Claims. (Cl. 26—60)

Matter enclosed in heavy brackets [ ] appears in the original patent but forms no part of this reissue specification; matter printed in italics indicates the additions made by reissue.

The invention relates to improvements in or relating to tentering and like machines for drying cloth or other web material, and more particularly to those machines which have been well known for a long time, in which the drying fluid, such as hot air, is projected on to the cloth through groups of blowing nozzles which are arranged on either side of the plane of travel or passage of the cloth.

It is known that, owing to the fact that the width of the cloths that may have to be treated on the same tenter varies considerably, often in a proportion of one to three, it was necessary to arrange the nozzles at some distance, of the order of about ten to fifteen centimetres, from the surfaces of the cloth, so as to allow the guide rails projecting above and below the plane of the cloth, and possibly the clips located above said plane to pass in the course of their transverse movement which is necessary for the treatment of cloths of smaller width than the maximum.

It has been admitted that this necessity of placing the blowing nozzles such a great distance above or beneath the cloth offers serious drawbacks, in view of the fact that with such an arrangement, the velocity of the air at the outlet of the nozzles decreases very rapidly owing to the formation of a substantially stationary air cushion between the orifices of the nozzles and the cloth. This is the reason why the present day arrangements very considerably decrease the practical efficiency of the tentering machines, since such efficiency largely depends on the velocity of the currents of hot air at the instant when they touch the cloth.

The purpose of the present invention is to remedy this drawback by creating the possibility of arranging the blowing nozzles level with the cloth, so that the currents of hot air reach it at their initial velocity of projection from the nozzles.

According to the present invention, a tentering or like machine for drying cloth or other material, including nozzles for drying fluid on one or both sides of the plane of passage of the material to be dried, is characterized in that the said nozzles are incorporated also in telescopically-arranged parts which are extensible in accordance with the width of the cloth, whereby the effective dimensions of the nozzles are automatically adjustable in accordance with said width.

The adjustment of the effective dimensions of the nozzles is preferably effected by movement of chain-guide rails when the spacing of said rails is altered; and according to a preferred embodiment of the invention the nozzles which are respectively located above and below the cloth and the orifices of which open level with the surface of said cloth, include a fixed tubular part, the dimension of which corresponds to the minimum width of the cloth to be treated, combined with tubular extensions which are slidably mounted on and relatively to the fixed part and are responsive to the movements of the chain-guide rails.

Owing to this fact, whatever be their total height, the chain-guide rails in no way hinder the construction of the device and the effective dimensions of the nozzles always correspond to the width of the cloth, so that the tenter constantly operates with its maximum efficiency. Furthermore, the moving of the rails closer together in no way affects the lateral evacuation of the saturated air, since the ends of the nozzles always remain the same distance from the rails.

Owing to the very high efficiency obtained when drying on tenters according to the invention, it is possible, either to reduce the length of the drying tenters while retaining the same output, or to increase considerably the output of existing tenters.

Embodiments of the invention are described hereinafter and diagrammatically illustrated simply by way of non-limitative examples, in the accompanying drawings in which:

Fig. 1 is a transverse vertical section of a tenter with self-feeding clips, provided with a hot air blowing device constructed according to the invention;

Fig. 2 shows diagrammatically a section of the nozzles taken at right angles to Fig. 1;

Figures 1A, 3:
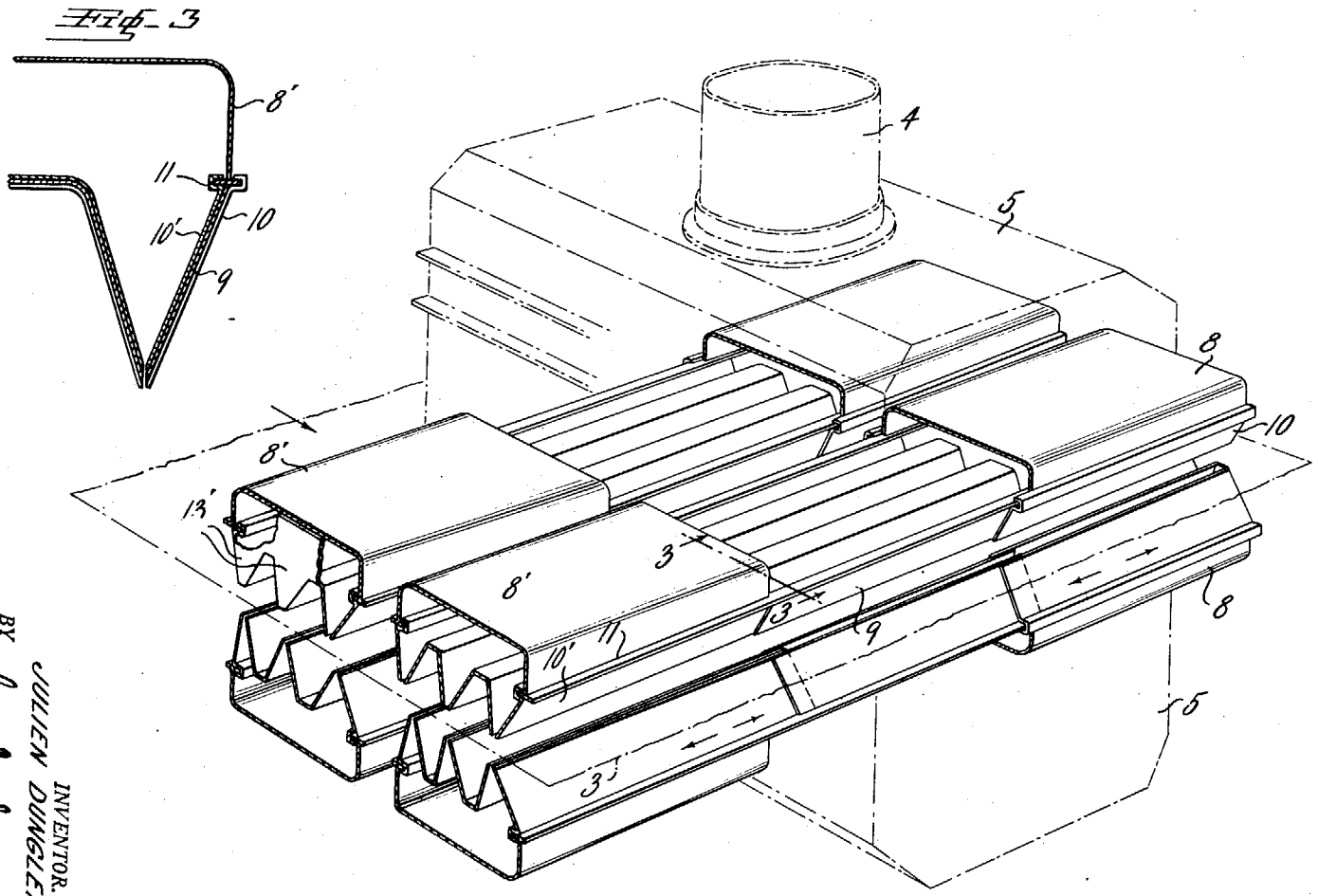
Fig. 1a is a perspective view of the tenter of Fig. 1 with certain parts shown in phantom lines, other parts being omitted for the sake of clarity.
Fig. 3 is a fragmentary detail view, in transverse section and taken along line 3—3 of Fig. 1a on an enlarged scale, showing the arrangement of the fixed part of nozzle means and of the movable parts thereof.

In these drawings, numerals 1 and 1′ designate the chain-guide rails of a tenter with self-feeding clips 2—2′; 3 indicates the cloth to be treated.

Respectively above and below the cloth 3, there are placed similarly constructed arrangements, each including a pipe 4 for supplying air which is set in motion by a fan (not shown) and passes through a chamber 5 provided with heating elements 6. The chamber 5 communicates with a distributing device 7 which is provided with extensions forming lateral conduits 8—8'. Below the manifold or device 7 (the ensuring description applying to the upper arrangement) and communicating with same, there is arranged the fixed medial or central tubular part 9 terminating in nozzles. On either side or end of each fixed part 9, there is provided a movable part or extension designated by numerals 10—10' respectively, each of which is shaped like the fixed part 9 terminating in nozzles movable together with said extensions and serves to extend the fixed part 9 in axial direction thereof more or less according to requirements. The extension 10 slides externally, whereas the extension 10' slides internally, on and substantially in alignment to the fixed part 9. When the distance between the rails 1—1' is changed, said extensions are slidably and telescopically moved while being supported and guided by slide-ways engaged on flanges 11 provided on the fixed lateral conduits 8—8' (see Figs 1a and 3).

The extensions 10—10' are displaced in response to the transverse movements of the rails 1—1' by means of connecting members 12—12'.

The closing of the outer ends of the conduits 8—8' is effected by means of movable or slidable end means or members 13—13' which are rigidly secured to the outer ends of the extensions 10—10' and are provided with fluid-tight packings (not shown) which follow the cross-sectional shape of said conduits (Fig. 1a).

The hot air under pressure is projected through the slits or nozzles of said tubular parts 9—10—10' on to the cloth 3 which passes a few millimetres from said nozzle; the air becomes satulated with moisture and escapes from the blowing nozzles through the free spaces between the nozzles.

In Fig. 1, the adjustment of the blowing nozzle system is assumed to be effected for cloth of maximum width; in the case in which cloth of smaller widths is to be treated, the rails 1—1' are moved towards each other and the extensions 10—10' automatically and telescopically move the same amount inwards and in alignment with respect to fixed part 9.

Figure 4:
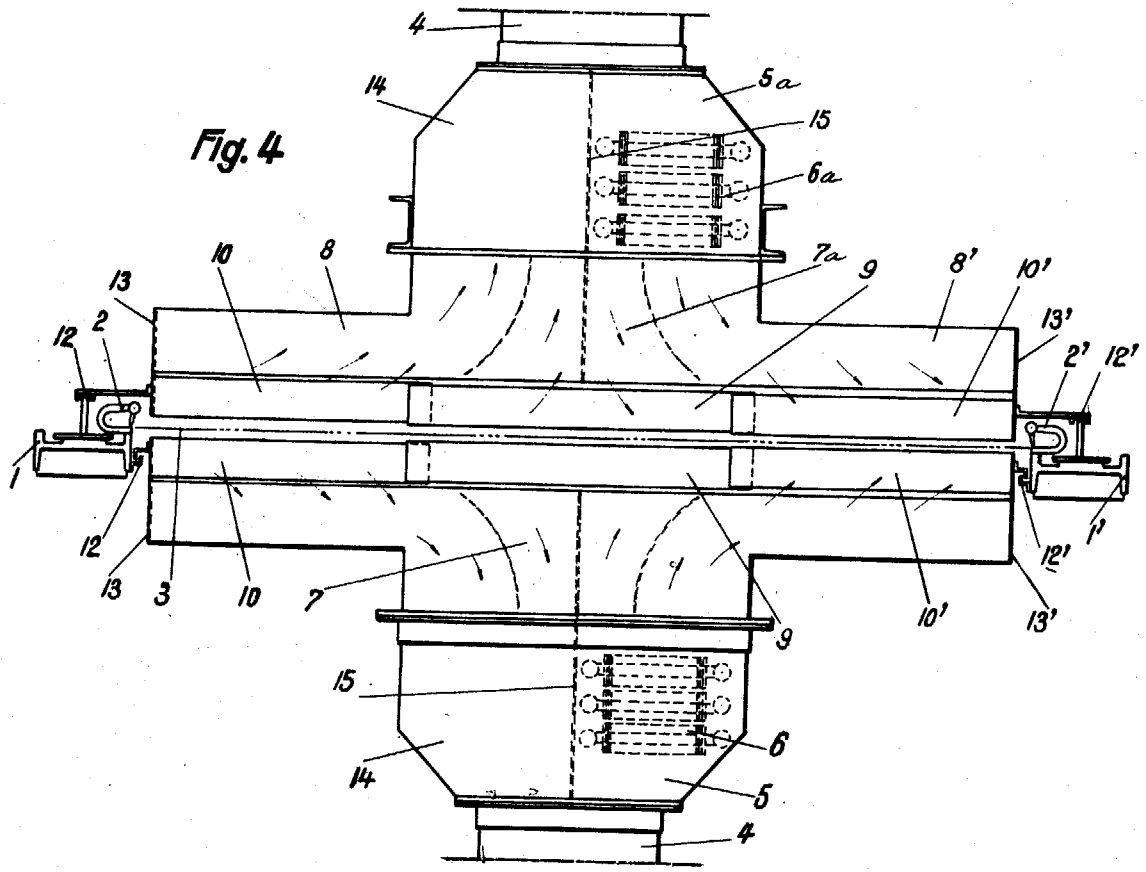
Fig. 4 shows a modification of Fig. 1.

In the modification of Fig. 4, there [is] are provided, on either surface of the cloth, two sets of separated nozzles, one set being blowing nozzles and the other set suction nozzles. The first are connected to the chamber 5a which conveys the hot air from heating elements 6a and *a* fan *(not shown)*, and the others *are connected* to a suction chamber 14, these chambers being separated by a partition 15. The distributing device or manifold for the air or fluid is designated by 7a.

It is also possible to provide blowing nozzles at one surface of the cloth and suction nozzles at the opposite surface.

It is, of course, understood that the invention is not limited to the particular construction described. For example, the adjustment of the length of the nozzles may be effected otherwise than by means of the chain-guide rails themselves.

It is, of course, also to be understood that the invention is applicable not only to single path tenters, but to those with stages. In this latter case, the chamber or chest containing the heating elements is placed outside the path.

It is obvious that it is also applicable to tenters which are only provided with nozzle arrangements on one side of the cloth, either above, or below.

It is also possible to consider the application of the invention to similar machines.

It can thus be seen that there have been provided, according to the invention, improvements in or relating to tentering or like machines for treating web material, characterized by the combination of central tubular fixed means including nozzles, said nozzles being directed to and extending adjacent the plane of cloth to be treated, movably arranged tubular extension means each including nozzles directed to and positioned to extend to the plane of the cloth to be treated, said extension means being arranged for movement beyond said central tubular fixed means, guide means arranged to extend in the direction of said central tubular fixed means and to support said extension means when moved along said guide means to thereby adjust the total operative extent of all nozzles commensurate with the width of the cloth to be treated, a distributing manifold disposed for supply of a fluid to said nozzles, lateral conduits in communication with said manifold and carrying said guide means, said extension means being each provided with an end member disposed for sliding engagement within said lateral conduits, respectively, chain-guide rails including clips positioned to extend beyond said extension means, said clips being adapted to engage said cloth when passing through said machine, and means connecting said chain-guide rails with said extension means whereby the total extent of said fixed means and of said movably arranged extension means may be automatically and telescopically adjusted in accordance with the distance of the chain-guide rails between each other.

Having thus described the invention, what is claimed as new and desired to be secured by Letters Patent, is:

[I claim:]

1. In a tentering machine for drying cloth and similar web material; the combination of a [central] fixed part carrying nozzles directed to and positioned adjacent to the plane of the cloth to be treated when passing through said machine, the extent of said [central] fixed part corresponding to the minimum width of the cloth to be treated, with a movably arranged extension provided with nozzles and positioned for slidable movement to and from [either] *at least one* end of said [central] *fixed* part, flange means arranged to slidably support said extension nozzles when moved in the direction of said [central] fixed part to thereby adjust the total operative extent of all nozzles commensurate with the width of the cloth to be treated, *and* a distributing manifold arranged to supply a fluid to said [central] *fixed* part and to said extension[s, chain-guide rails including clips positioned at the outer ends of said extensions, said clips being adapted to engage said cloth when passing through said machine, and means connecting said chain-guide rails with said outer ends of said extensions whereby the total extent of said nozzles on said fixed part and of said movably arranged extension nozzles may be automatically adjusted in accordance with the distance of the chain-guide rails between each other].

2. In a tentering machine for drying cloth and similar web material; the combination of a tubular [fixed] part including nozzle means, said nozzle means being directed to and positioned adjacent the plane of the cloth to be treated, with *at least one* movable tubular extension part[s each] including nozzle means and arranged to extend in the direction of said *first-named* tubular [fixed] part, guide means connected to said [fixed] *first-named* part and arranged to permit movement of said extension part[s] in the direction to and from said *first-named* tubular [fixed] part to thereby adjust the total operative extent of all nozzle means commensurate with the width of the cloth to be treated, *and* a distributing manifold arranged for supplying a fluid to said nozzles[, chain-guide rails including clips disposed for location beyond said extension parts, said clips being adapted to engage said cloth when passing through said machine, and means connecting said chain-guide rails with said extension parts whereby the total extent of said fixed part and of said movable extension parts may be automatically adjusted in accordance with the distance of the chain-guide rails between each other].

3. In a tentering machine for drying cloth and web material; the combination of [central] *first* tubular [fixed] means including nozzles, said nozzles being directed to and extending adjacent the plane of cloth to be treated, [movably arranged] *second* tubular [extension] means [each] including nozzles directed to and positioned to extend to the plane of the cloth to be treated, said [extension] *first and second tubular* means being arranged for movement [beyond said central tubular fixed means] *with respect to each other*, guide means arranged to extend in the direction of said [central] tubular [fixed] means and to support said [extension] means when moved along said guide means to thereby adjust the total operative extent of all nozzles commensurate with the width of the cloth to be treated, *and* a distributing manifold disposed for supply of a fluid to said nozzles, lateral conduits in communication with said manifold and carrying said guide means[, said extension means being each provided with an end member disposed for sliding engagement within said lateral conduits, respectively, chain-guide rails including clips positioned to extend beyond said extension means, said clips being adapted to engage said cloth when passing through said machine, and means connecting said chain-guide rails with said extension means whereby the total extent of said fixed means and of said movably arranged extension means may be automatically and telescopically adjusted in accordance with the distance of the chain-guide rails between each other].

4. A tentering machine for drying cloth and like web material comprising, a combination, central tubular fixed means including nozzles directed to and arranged for position adjacent the cloth to be treated, tubular extension means each including nozzles directed to and disposed to extend to and adjacent said cloth to be treated, said extension means being arranged substantially in alignment with and positioned for support by said central tubular fixed means, guide means arranged to facilitate sliding movement of said extension means in substantially aligned direction to and from said central tubular fixed means to thereby adjust the total operative extent of all nozzles commensurate with the width of the cloth to be treated, a distributing manifold for supplying a fluid to said nozzles, *and* lateral conduits in communication with said manifold, said extension means being each provided with an end member disposed for displacement within said lateral conduits, respectively[, chain-guide rails including clips positioned adjacent the outer ends of said extension means, said clips being adapted to engage said cloth when passing through said machine, and end means connecting said chain-guide rails with said extension means whereby said slidably arranged extension means may be automatically adjusted relatively to said tubular fixed means in accordance with the distance of the chain-guide rails between each other].

5. A tentering machine for treating cloth and like web material comprising, in combination, tubular [fixed] means including nozzles directed to and arranged for position adjacent the cloth to be treated, [slidable] tubular extension means each including nozzles directed to and disposed to extend to and adjacent said cloth to be treated, said extension means being substantially aligned with said *first* tubular [fixed] means, flange means arranged on said [fixed] *first* means and adapted to support said extension means when slid in lengthwise direction to and from said *first* tubular [fixed] means to thereby telescopically adjust the total operative dimension of said nozzles commensurate with the width of the cloth to be treated, *and* means for engaging said cloth and positioned adjacent said extension means for moving said cloth past said nozzles[, and means positioned intermediate said cloth engaging means and said extension means whereby said extension means may be automatically adjusted in lengthwise direction of and relatively to said fixed means in accordance with the distance between said cloth engaging means across said tubular fixed means of said tubular extension means].

6. In a drying tentering machine and the like, in combination, fixed nozzle means situated close to the plane of a stretched cloth, the length of said fixed nozzle means corresponding to the minimum width of the cloth to be treated, extension nozzle means situated on both sides of said fixed nozzle means and slidable relatively thereto to vary the total operative length of all nozzle means depending upon the width of the cloth to be treated, said nozzle means having openings directed toward the cloth, a distribution manifold communicating with said fixed nozzle means and having lateral extensions communicating with said extension nozzle means, means connected with said distributing manifold for supplying a fluid thereto, chain-guide rails situated on both sides of said extension nozzle means, clips carrying said cloth and supported by said chain-guide rails, and members connecting said chain-guide rails with said extension nozzle means, whereby the total operative length of all nozzle means may be varied when the spacing of the chain-guide rails is altered.

7. *In a tentering machine for drying cloth and similar web material; the combination of a fixed part carrying nozzles directed to and positioned adjacent to the plane of the cloth to be treated when passing through said machine, the extent of said fixed part corresponding to the minimum width of the cloth to be treated, with a movably arranged extension provided with nozzles and positioned for slidable movement to and from at least one end of said fixed part, flange means arranged to slidably support said extension nozzles when moved in the direction of said fixed part to thereby adjust the total operative extent of all nozzles commensurate with the width of*

*the cloth to be treated, and a distributing manifold arranged to supply a fluid to said fixed part and to said extension.*

*8. In a tentering machine for drying cloth and similar web material; the combination of a tubular part including nozzle means, said nozzle means being directed to and positioned adjacent the plane of the cloth to be treated, with at least one movable tubular extension part including nozzle means and arranged to extend in the direction of said first-named tubular part, guide means connected to said first-named part and arranged to permit movement of said extension part in the direction to and from said first-named tubular part to thereby adjust the total operative extent of all nozzle means commensurate with the width of the cloth to be treated, and a distributing manifold arranged for supplying a fluid to said nozzles.*

*9. In a tentering machine for drying cloth and web material; the combination of first tubular means including nozzles, said nozzles being directed to and extending adjacent the plane of cloth to be treated, second tubular means including nozzles directed to and positioned to extend to the plane of the cloth to be treated, said first and second tubular means being arranged for movement with respect to each other, guide means arranged to extend in the direction of said tubular means and to support said means when moved along said guide means to thereby adjust the total operative extent of all nozzles commensurate with the width of the cloth to be treated, and a distributing manifold disposed for supply of a fluid to said nozzles, lateral conduits in communication with said manifold and carrying said guide means.*

*10. A tentering machine for drying cloth and like web material comprising, in combination, central tubular fixed means including nozzles directed to and arranged for position adjacent the cloth to be treated, tubular extension means each including nozzles directed to and disposed to extend to and adjacent said cloth to be treated,*

*said extension means being arranged substantially in alignment with and positioned for support by said central tubular fixed means, guide means arranged to facilitate sliding movement of said extension means in substantially aligned direction to and from said central tubular fixed means to thereby adjust the total operative extent of all nozzles commensurate with the width of the cloth to be treated, a distributing manifold for supplying a fluid to said nozzles, and lateral conduits in communication with said manifold, said extension means being each provided with an end member disposed for displacement within said lateral conduits, respectively.*

*11. A tentering machine for treating cloth and like web material comprising, in combination, first tubular means including nozzles directed to and arranged for position adjacent the cloth to be treated, tubular extension means each including nozzles directed to and disposed to extend to and adjacent said cloth to be treated, said extension means being substantially aligned with said first tubular means, flange means arranged on said first means and adapted to support said extension means when slid in lengthwise direction to and from said first tubular means to thereby telescopically adjust the total operative dimension of said nozzles commensurate with the width of the cloth to be treated, and means for engaging said cloth and positioned adjacent said extension means for moving said cloth past said nozzles.*

JULIEN DUNGLER.

REFERENCES CITED

The following references are of record in the file of this patent or the original patent:

UNITED STATES PATENTS

| Number | Name | Date |
|---|---|---|
| 401,932 | Craven | Apr. 23, 1889 |
| 1,676,092 | Kemp | July 3, 1928 |
| 1,717,004 | Buck | June 11, 1929 |
| 2,270,155 | Willen | Jan. 13, 1942 |